(12) United States Patent
Lee et al.

(10) Patent No.: US 11,560,805 B2
(45) Date of Patent: Jan. 24, 2023

(54) ROTOR AND TURBO MACHINE INCLUDING SAME

(71) Applicant: DOOSAN ENERBILITY CO., LTD., Changwon (KR)

(72) Inventors: Ji Moon Lee, Daegu (KR); Jae Min Ju, Changwon (KR); Yoo Seok Jeong, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/329,223

(22) Filed: May 25, 2021

(65) Prior Publication Data

US 2022/0065115 A1 Mar. 3, 2022

(30) Foreign Application Priority Data

Aug. 25, 2020 (KR) .................. 10-2020-0106915

(51) Int. Cl.
*F01D 5/30* (2006.01)
*F01D 5/32* (2006.01)

(52) U.S. Cl.
CPC .............. *F01D 5/303* (2013.01); *F01D 5/32* (2013.01); *F05D 2250/13* (2013.01); *F05D 2260/36* (2013.01)

(58) Field of Classification Search
CPC . F01D 5/303; F01D 5/32; F01D 5/147; F01D 5/18; F01D 5/187; F01D 5/188; F01D 5/282; F01D 5/284; F01D 9/06; F01D 9/065; F05D 2240/126; F05D 2240/80; F05D 2260/20; F05D 2260/22141; F05D 2260/941; F05D 2300/603; F05D 2300/6033; F05D 2250/13; F05D 2260/36
See application file for complete search history.

(56) References Cited

U.S. PATENT DOCUMENTS

| 8,186,961 | B2 * | 5/2012 | Stone | F01D 5/326 416/221 |
| 2009/0324414 | A1 * | 12/2009 | Helmis | F01D 5/326 416/220 R |
| 2015/0037161 | A1 * | 2/2015 | Kaltenbach | F01D 5/3007 416/215 |
| 2018/0283188 | A1 * | 10/2018 | Jang | F01D 5/32 |

FOREIGN PATENT DOCUMENTS

| KR | 20190041702 | * | 4/2019 | .............. F01D 5/08 |
| KR | 1020190041702 A | | 4/2019 | |
| KR | 1020200013475 A | | 2/2020 | |

OTHER PUBLICATIONS

KR OA dated Dec. 8, 2021.

* cited by examiner

*Primary Examiner* — Brian P Wolcott
*Assistant Examiner* — Eric A Lange
(74) *Attorney, Agent, or Firm* — Harvest IP Law LLP

(57) ABSTRACT

A rotor and a turbo machine including the same are provided. The rotor includes a disk including a disk slot, a blade including a root member inserted into the disk slot and an airfoil disposed outside the root member in a radial direction of the disk, a locking sheet disposed inside the root member in the radial direction, and a fixing portion disposed inside the root member in the radial direction and configured to fix the locking sheet to the root member.

10 Claims, 10 Drawing Sheets

ROTOR AND TURBO MACHINE INCLUDING SAME

CROSS REFERENCE TO RELATED APPLICATION

This application claims priority to Korean Patent Application No. 10-2020-0106915, filed on Aug. 25, 2020, the entire disclosure of which is incorporated herein by reference in its entirety.

BACKGROUND

1. Field

Apparatuses and methods consistent with exemplary embodiments relate to a rotor and a turbo machine including the same, and more particularly, to a rotor generating a driving force for power generation and a turbo machine including the same.

2. Description of the Related Art

A turbo machine refers to a device that generates a driving force used to generate electric power with a fluid (e.g., a gas) passing through the turbo machine. Therefore, a turbo machine and a generator are usually installed and used together. The turbo machines include gas turbines, steam turbines, and wind power turbines. A gas turbine is a device that generates combustion gas by mixing compressed air and gas and by burning the mixture, and generates a driving force for generation of electric power by using the combustion gas. A steam turbine is a device that heats water to generate steam and generates a driving force for generation of electric power by using the steam. A wind turbine is a device that converts wind power into a driving force for generation of electric power.

A gas turbine includes a compressor, a combustor, and a turbine. The compressor includes a plurality of compressor vanes and a plurality of compressor blades alternately arranged in a compressor casing with an air inlet through which air is introduced. The introduced air is compressed by the compressor vanes and the compressor blades while passing through an inside of the compressor casing. The combustor supplies fuel to the compressed air compressed by the compressor and ignites the fuel-air mixture with an igniter to generate a high temperature and high-pressure combustion gas. The combustion gas is supplied to the turbine. The turbine includes a plurality of turbine vanes and a plurality of turbine blades alternately arranged in a turbine casing. The combustion gas introduced into the turbine casing rotates the turbine blades while passing through the inside of the turbine casing and then flows out of the turbine casing through a turbine diffuser.

A steam turbine includes an evaporator and a turbine. The evaporator generates steam by heating water supplied from the outside. The turbine of the steam turbine includes a plurality of turbine vanes and a plurality of turbine blades alternately arranged in a turbine casing. While the gas turbine uses the combustion gas, the steam turbine uses the steam generated by the evaporator as a driving force source for rotating the turbine blades.

For example, the turbine includes a turbine disk and a plurality of turbine blades at each stage. The turbine disk is formed in a disk shape and has a plurality of turbine disk slots that are formed on an outer surface of the turbine disk and arranged in a circumferential direction of the turbine disk. The turbine blades are installed to be engaged with respective turbine disk slots. Each turbine blade includes a root member, a platform member, and an airfoil. The root member is inserted into the turbine disk slot. The platform is coupled to an outer end of the root member in a radial direction of the turbine disk. The airfoil is coupled to an outer surface of the platform in the radial direction of the turbine disk and is rotated by a stream of working fluid (i.e., combustion gas or steam). The turbine disk slot has a curved (e.g., fir-tree shaped) inner surface, and the root member has a curved outer surface corresponding to the contour of the inner surface of the turbine disk slot.

When the root member of each turbine blade is inserted into a corresponding one of the turbine disk slots, there is a clearance between the surface of the root member and the surface of the turbine disk slot. This clearance facilitates the work of assembling the root member and the turbine disk, and is designed to take into account thermal expansion of each component during operation of the turbo machine.

During the operation of a turbo machine, each blade is in close contact with the disk due to strong centrifugal force, preventing the blade from moving in the turbine disk slot. However, during a period when the turbo machine is stopped, the rotor rotates at a low speed and the centrifugal force applied to the blades weakens. Therefore, during this period, the gap between the blade and the disk within the turbine disk slot increases, resulting in a relative movement between the blade and the disk. Therefore, to prevent the relative movement between the blade and the disk, the turbo machine includes a contact structure that brings the blade and the disk into close contact.

The contact structure includes a locking sheet disposed between the root member of the blade and the disk and a wedge for pressing the locking sheet radially outward while being disposed between the locking sheet and the disk. The locking sheet is first inserted into the turbine disk slot and then the wedge is inserted. Thus, the wedge presses the locking sheet radially outward. In this regard, related art turbo machines have a problem in that the locking sheet is bent in the process of inserting the wedge into the disk slot, resulting in a change in shape or damage of the locking sheet. This deteriorates the axial force applied by the locking sheet to prevent the relative movement between the blade and the disk.

SUMMARY

Aspects of one or more exemplary embodiments provide a rotor capable of preventing deformation of a locking sheet when a wedge is installed in a disk slot, and a turbo machine including the same.

Additional aspects will be set forth in part in the description which follows and, in part, will become apparent from the description, or may be learned by practice of the exemplary embodiments.

According to an aspect of an exemplary embodiment, there is provided a rotor including: a disk including a disk slot; a blade including a root member inserted into the disk slot and an airfoil disposed outside the root member in a radial direction of the disk; a locking sheet disposed inside the root member in the radial direction; and a fixing portion disposed inside the root member in the radial direction and configured to fix the locking sheet to the root member.

According to an aspect of another exemplary embodiment, there is provided a turbo machine including: a stator configured to guide a fluid flowing through an inside thereof; and a rotor disposed in the stator and rotated by the fluid flowing through the stator. The rotor includes: a disk including a disk slot; a blade including a root member inserted into the disk slot and an airfoil disposed outside the root member in a radial direction of the disk; a locking sheet disposed inside the root member in the radial direction; and a fixing portion disposed inside the root member in the radial direction and configured to fix the locking sheet to the root member.

The root member may include an insertion groove at a radially inner end thereof, and the locking sheet may be inserted into the insertion groove.

The fixing portion may protrude from an inner wall surface of the insertion groove and support the locking sheet from an inner side of the locking sheet in the radial direction.

The locking sheet may have a shape in which a width measured along a circumferential direction gradually increases toward outward in the radial direction when viewed from an axial direction of the disk, and the fixing portion may protrude from the inner wall surface of the insertion groove and support a side surface of the locking sheet.

The locking sheet may have a trapezoidal shape such that a width of the locking sheet is greater at an outer position in the radial direction than at an inner position in the radial direction. The fixing portion may include a pair of fixing portions, and the pair of fixing portions may be in contact with respective side surfaces of the locking sheet. A distance between the pair of fixing portions may gradually increase toward outward in the radial direction.

The fixing portion may be fastened to the locking sheet and an inner end of the root member to fix the locking sheet to the root member.

The fixing portion may include a plurality of fixing portions spaced apart from each other in an axial direction of the disk.

The root member may include an insertion groove at a radially inner end thereof, the locking sheet may be inserted into the insertion groove, and the fixing portion may be disposed between the locking sheet and an inner wall surface of the insertion groove.

The plurality of fixing portion may be spaced from each other in the circumferential direction of the disk, and the locking sheet may be interposed therebetween.

The rotor may further include an auxiliary fastening sheet fastened to an inner side of the locking sheet in the radial direction and configured to have a larger width measured along the circumferential direction than the locking sheet, and the fixing portion may be fastened to the auxiliary fastening sheet and an inner end of the root member in the radial direction.

The rotor and the turbo machine according to the exemplary embodiments includes the fixing portion for fixing the locking sheet to the root member from the radially inner side of the root member. Therefore, when the wedge is installed after the locking sheet is inserted into the disk slot, it is possible to prevent the locking sheet from being deformed or damaged.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
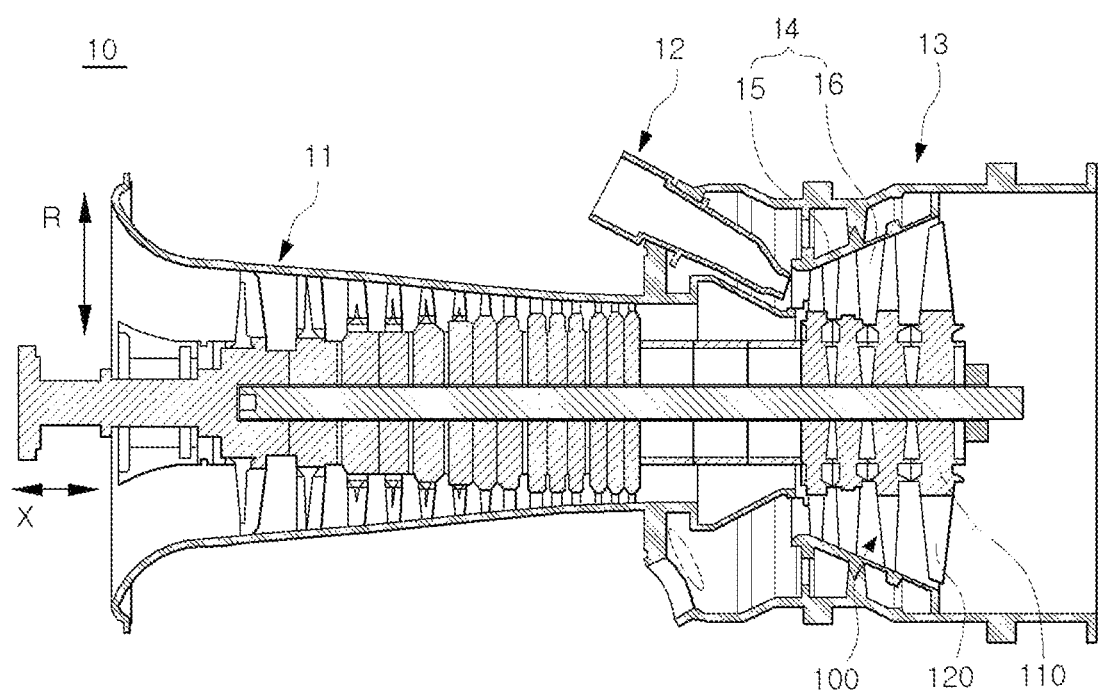
FIG. 1 is a cross-sectional view illustrating a schematic structure of a gas turbine according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Terms such as "first," "second," and so on may be used to describe a variety of components, but the components should not be limited by these terms. These terms may be merely used to distinguish one component from other components. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a rotor and a turbo machine including the rotor, according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a cross-sectional view illustrating a schematic structure of a gas turbine according to an exemplary embodiment. Referring to FIG. 1, a gas turbine 10 includes a compressor 11, a combustor 12, and a turbine 13. In a flow direction of gas (e.g., compressed air or combustion gas) in the gas turbine 10, the compressor 11 is disposed at an upstream side and the turbine 13 is disposed at a downstream side. The combustor 12 is disposed between the compressor 11 and the turbine 13.

The compressor 11 includes compressor vanes and compressor rotors including a compressor disk and compressor blades in a compressor casing. The turbine 13 includes turbine vanes 16 and turbine rotors 100 including a turbine disk and turbine blades in a turbine casing 15. The compressor vanes and the compressor rotors are arranged in multiple stages along the flow direction of compressed air, and the turbine vanes 16 and the turbine rotors 100 are also arranged in multiple stages along the flow direction of combustion gas. The compressor 11 has an internal space of which volume decreases from a front stage to a rear stage so that the introduced air can be compressed while passing through the inside of the compressor 11. On the contrary, the turbine 13 has an internal space of which volume increases from a front stage to a rear stage so that the introduced combustion gas expands while passing through the inside of the turbine 13.

In addition, a torque tube serving as a torque transmission member is disposed between the last-stage compressor rotor and the first-stage turbine rotor to transfer rotational torque generated by the turbine 13 to the compressor 11. Although the torque tube may include a plurality of torque tube disks arranged in three stages as illustrated in FIG. 1, this is only an example, and the torque tube may include a plurality of torque tube disks arranged in four or more stages or two or less stages.

The compressor rotor includes a compressor disk and a plurality of compressor blades. A plurality of compressor disks may be disposed in the compressor casing, and each of the compressor disks is fastened by a tie road so as not to be separated from each other in an axial direction. That is, the compressor rotor disks are arranged in the axial direction with the tie rod extending through centers thereof. In addition, adjacent compressor rotor disks are arranged such that opposing surfaces of the adjacent compressor rotor disks are pressed against each other by the tie rod so that the compressor rotor disks cannot rotate relative to each other.

The plurality of compressor blades are radially coupled to an outer surface of each of the compressor rotor disks along a circumferential direction. For each compressor stage, the plurality of compressor vanes coupled to an inner surface of the compressor casing along the circumferential direction are alternately arranged with the plurality of compressor blades. While the compressor rotor disks rotate along with a rotation of the tie rod 4, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be defined as a compressor stator to distinguish them from the compressor rotor.

The tie rod is installed to extend through the centers of the plurality of compressor rotor disks and the plurality of turbine disks, such that one end thereof is fastened to the compressor rotor disk located on a foremost end side of the compressor and the other end is fastened by a fixing nut.

Because the tie rod may be formed in various structures according to a type of a gas turbine, a shape of the tie rod is not limited to the example illustrated in FIG. 1. There are three types of tie rods: a single-type in which a single tie rod extends through the centers of the compressor rotor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases the pressure of fluid flowing into the combustor and adjusts the flow angle of the fluid to be substantially equal to the designed flow angle.

The combustor 12 mixes the introduced compressed air with fuel and burns the air-fuel mixture to produce high-temperature and high-pressure combustion gas, thereby raising the temperature of the combustion gas to a heat-resistant temperature at which the components of the combustor and the components of turbine can endure through an isothermal combustion process.

A plurality of combustors constituting the combustor 12 are provided in a form of a cell in a combustor casing. Each combustor includes a nozzle for injecting fuel, a liner defining a combustion chamber, and a transition piece serving as a connector between the combustor and the turbine.

The liner defines the combustion chamber in which the fuel injected through the fuel injection nozzle and the compressed air fed from the compressor are mixed and burned. That is, the liner includes a combustion chamber that provides combustion space in which the fuel-air mixture is combusted, and a liner annular flow passage that surrounds the combustion chamber to provide an annular space. The nozzle for injecting fuel is installed at a front end of the liner, and an igniter is installed in a wall of the liner.

In the liner annular flow passage, compressed air introduced through a plurality of holes formed in an outer wall of the liner flows, and the introduced compressed air cools the liner while flowing toward the transition piece. Because the compressed air flows along the outer wall of the liner, it is possible to prevent the liner from being thermally damaged by high temperature combustion gas.

The transition piece is coupled to a rear end (i.e., downstream end) of the liner to deliver the combustion gas toward the turbine. The transition piece has a transition piece annular flow passage surrounding an internal space of the transition piece. As the compressed air flows along the annular flow passage, an outer wall of the transition piece is cooled by the compressed air to prevent thermal damage by high temperature combustion gas.

The high-temperature and high-pressure combustion gas supplied to the turbine 13 expands while passing through the turbine. The expansion of the combustion gas causes impulse and reaction forces with respect to the turbine blades, thereby generating torque. The torque is transferred to the compressor through the torque tube, and an excessive portion of the torque exceeding the power required for driving the compressor is used to drive a generator or the like.

The turbine 13 is similar in structure to the compressor 11. That is, the turbine 13 includes a plurality of turbine rotors 100 similar to the compressor rotors of the compressor 11. Each turbine rotor 100 includes a turbine disk 110 and a plurality of turbine blades 120 radially coupled to the outer surface of the turbine disk 110. The turbine disk 110 and the plurality of turbine blades 120 are designed in a structure in which they are arranged in a multi-stage to be spaced apart from each other along a flow direction of the combustion gas. A plurality of turbine vanes 16 are radially coupled to the inner surface of the turbine casing 15 along the circumferential direction such that each stage of turbine vanes 16 is disposed between adjacent stages of turbine blades 120 to guide a flow of the combustion gas passing through the turbine blades 120. Here, the turbine casing 15 and the turbine vanes 16 may be defined as a turbine stator 14 to distinguish them from the turbine rotor 100.

Figure 2:
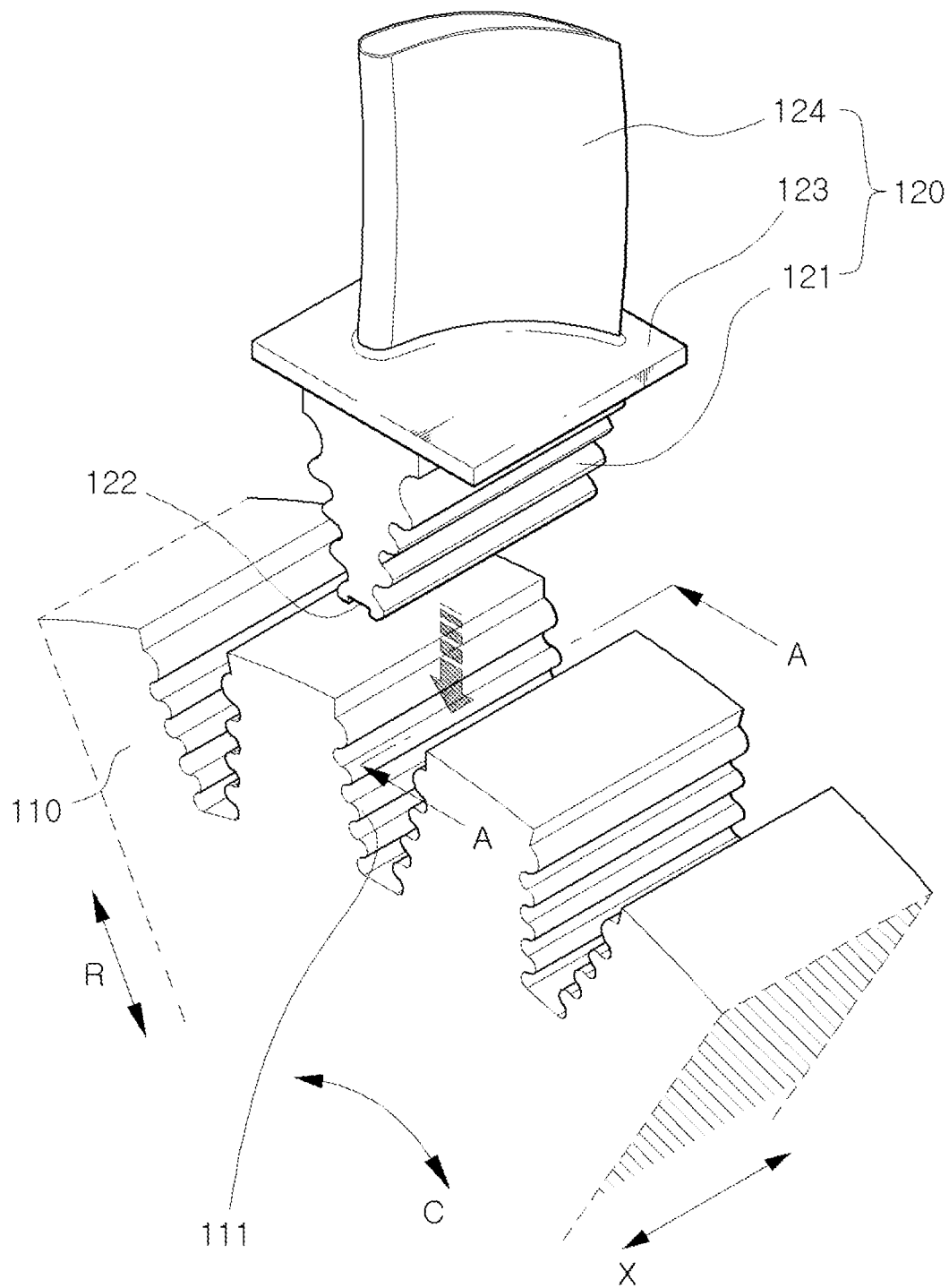
FIG. 2 is a perspective view illustrating a turbine rotor according to a first exemplary embodiment.

FIG. 2 is a perspective view illustrating a turbine rotor 100 according to a first exemplary embodiment. Referring to FIG. 2, the turbine disk 110 has multiple turbine disk slots 111 arranged on the outer surface along a circumferential direction of the turbine disk 110. The turbine disk 110 has a circular disk shape. The turbine blades 120 are installed on the radially outer surface of the turbine disk 110. Each turbine blade 120 includes a root member 121 inserted into the turbine disk slot 111, a platform 123 coupled to the radially outer surface of the root member 121, and an airfoil 124 that is coupled to the radially outer surface of the platform 123 and is rotated by the combustion gas.

The platform 123 couples the airfoil 124 to the root member 121. The platform 123 is configured such that a side surface thereof is in contact with an adjacent platform 123 to maintain a spacing between adjacent turbine blades 120. FIG. 2 illustrates a case in which the platform 123 has a plate shape, but it is understood that this is only an example, and other exemplary embodiments are not limited thereto.

The root member 121 coupled to each of the turbine disk slots 111 is provided on a lower surface of the platform 123. The root member 121 has a shape corresponding to a shape of a curved contour of the turbine disk slot 111, which varies according to the type of a commercial gas turbine 10. The dovetail type or the fir tree type are mainly used.

Examples of a coupling method of the root member 121 includes a tangential type in which the root member 121 is inserted into the turbine disk slot 111 in a tangential direction to the outer circumferential surface of the turbine disk 110 and an axial type in which the root member 121 is inserted into the turbine disk slot 111 in an axial direction of the turbine disk. Alternatively, the turbine blades 120 may be fastened to the turbine disk 110 using coupling tools other than such types, such as keys or bolts.

The airfoil 124 is formed on an upper surface of the platform 123. The airfoil 124 has a profile optimized according to specifications of the gas turbine 10 and includes a leading edge disposed at an upstream side based on the flow direction of combustion gas and a trailing edge disposed at a downstream side.

Unlike the compressor blades, the turbine blades 120 comes into direct contact with high-temperature and high-pressure combustion gas. Because the combustion gas has a high temperature of about 1700° C., a cooling means is required. To this end, the gas turbine 10 has bleeding passages through which the compressed air extracted from some portions of the compressor is supplied to the turbine blades 120.

The bleeding passage may be an external passage that is formed outside the turbine casing, an internal passage that is formed through the turbine rotor disk, or a combined passage composed of the external passage and the internal passage. A plurality of film cooling holes are formed on the surface of the airfoil 124. The film cooling holes are in communication with cooling passages formed in the airfoil 124 to serve to feed compressed air to the surface of the airfoil 124.

Here, reference character C denotes a circumferential direction of the turbine disk 110, reference character R denotes a radial direction of the turbine disk 110, and reference character X denotes an axial direction serving as a rotation center of the turbine disk 110. Further, reference character X also denotes a longitudinal direction of the tie rod illustrated in FIG. 1.

Figure 3:
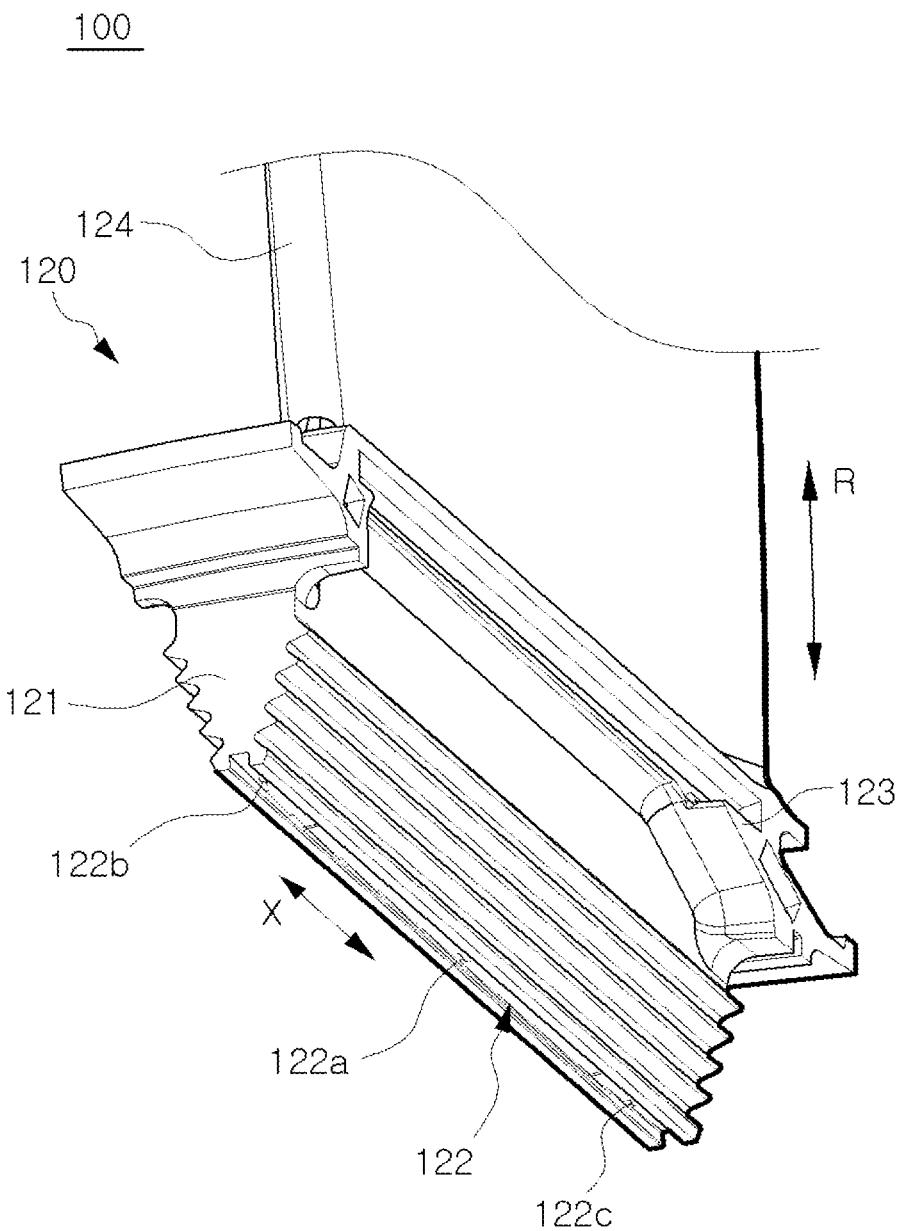
FIG. 3 is a perspective view illustrating a turbine blade which is viewed in a radially outward direction from an inside according to the first exemplary embodiment.
Figure 4:
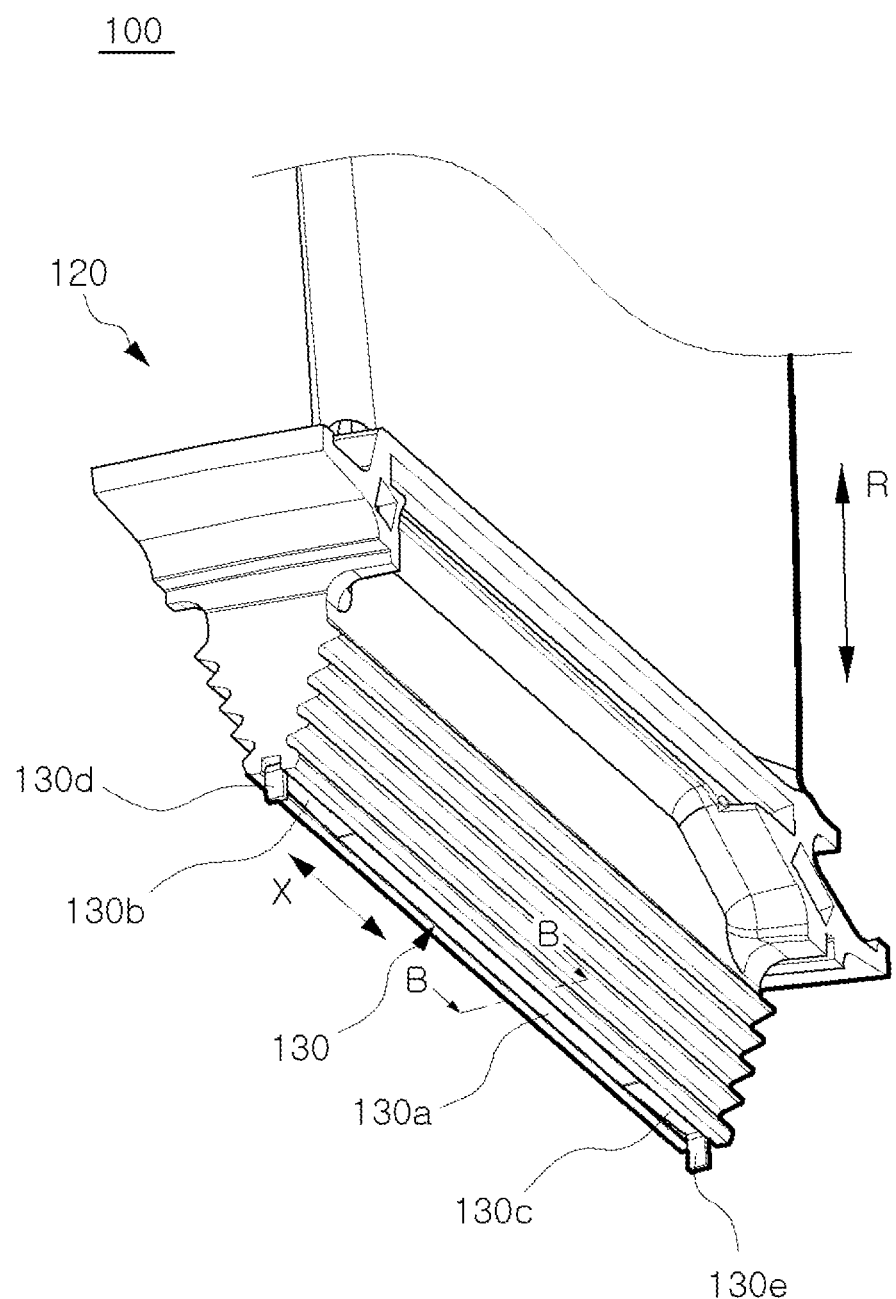
FIG. 4 is a perspective view illustrating a state in which a locking sheet is inserted into an insertion groove according to the first exemplary embodiment.
Figure 5:
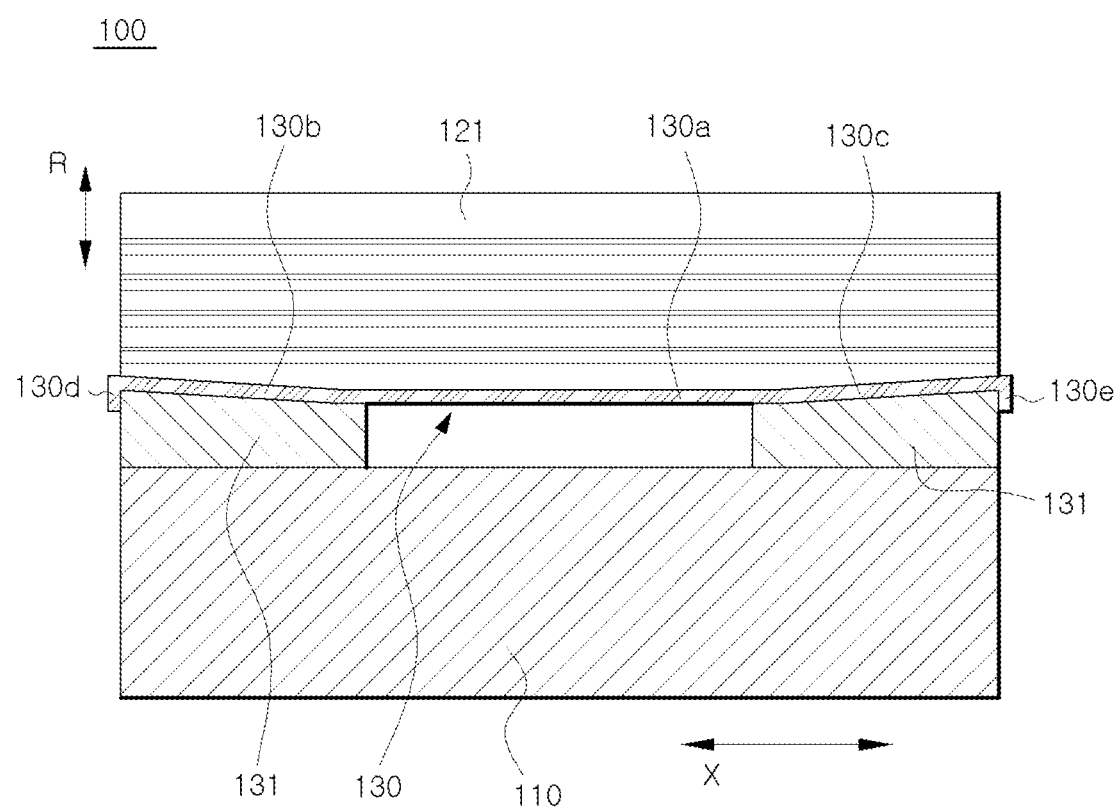
FIG. 5 is a cross-sectional view illustrating the turbine rotor taken along line A-A in FIG. 2.

FIG. 3 is a perspective view illustrating a turbine blade which is viewed in a radially outward direction from an inside according to the first exemplary embodiment, FIG. 4 is a perspective view illustrating a state in which a locking sheet is inserted into an insertion groove according to the first exemplary embodiment, and FIG. 5 is a cross-sectional view illustrating the turbine rotor taken along line A-A in FIG. 2.

Referring to FIGS. 3 to 5, the turbine rotor 100 according to the first exemplary embodiment further includes a locking sheet 130 and a wedge 131.

The locking sheet 130 is inserted into the turbine disk slot 111 and disposed inside the root member 121 in the radial direction R. The wedge 131 is inserted into the turbine disk slot 111 and disposed inside the locking sheet 130 in the radial direction R. The locking sheet 130 may have a plate shape, and the wedge 131 may have a block shape.

Referring to FIGS. 4 and 5, the locking sheet 130 includes a first sheet portion 130a, a second sheet portion 130b, and a third sheet portion 130c. The first sheet portion 130a is arranged to extend along the axial direction X. The second sheet portion 130b and the third sheet portion 130c are connected to the axial ends of the first sheet portion 130a, respectively. Each of the second sheet portion 130b and the third sheet portion 130c is inclined to have a down slope from the outer end to the inner end thereof in the axial direction X. That is, the radial distance of a portion of the second sheet portion 130b or the third sheet portion 130c to the bottom surface of the turbine disk slot is gradually reduced toward the inner end from the outer end in the axial direction X. In this case, the root member 121 is fixed so as not to move with respect to the locking sheet 130 in the axial direction X.

The locking sheet 130 may include a fourth sheet portion 130d and a fifth sheet portion 130e. The fourth sheet portion 130d and the fifth sheet portion 130e are bent radially inward from an end of the second sheet portion 130b and an end of the third sheet portion 130c, respectively to surround the wedge 131. In this case, the wedge 131 is fixed so as not to move with respect to the locking sheet 130 in the axial direction X.

The wedge 131 presses the locking sheet 130 outward in the radial direction R so that the root member 121 and the inner wall of the turbine disk slot 111 are in tight contact with each other. The wedge 130 may be a hollow wedge shape having a cavity extending in the axial direction X so that cooling air can flow into the turbine disk slot 111 from the outside.

The root member 121 has an insertion groove 122 formed at an inner end portion thereof in the radial direction R, and the insertion groove 122 is elongated along the axial direction X. The locking sheet 130 is inserted into the insertion groove 122. The insertion groove 122 includes a first insertion groove 122a, a second insertion groove 122b, and a third insertion groove 122c. The first sheet portion 130a is inserted into the first insertion groove 122a. The second insertion groove 122b and the third insertion groove 122c are formed to be continuous from ends of the first insertion groove 122a in the axial direction X, respectively. The radially outer wall of each of the second insertion groove 122b and the third insertion groove 122c is inclined to have a down slope from the outer end to the inner end thereof in the axial direction X. That is, the radial distance of a portion of the radially outer wall of each of the second insertion groove 122b and the third insertion groove 122c is gradually reduced toward the inner end from the outer end thereof in the axial direction X. The second sheet portion 130b and the third sheet portion 130c are inserted into the second insertion groove 122b and the third insertion groove 122c, respectively.

The turbine rotor 100 may further include a fixing portion 140. The fixing portion 140 is disposed at an inner position in the radial direction to fix the locking sheet 130 to the root member 121. Therefore, the exemplary embodiment has an advantage of preventing the locking sheet 130 from being deformed or damaged when the wedge 131 is installed after the locking sheet 130 is inserted into the turbine disk slot 111.

Figure 6:
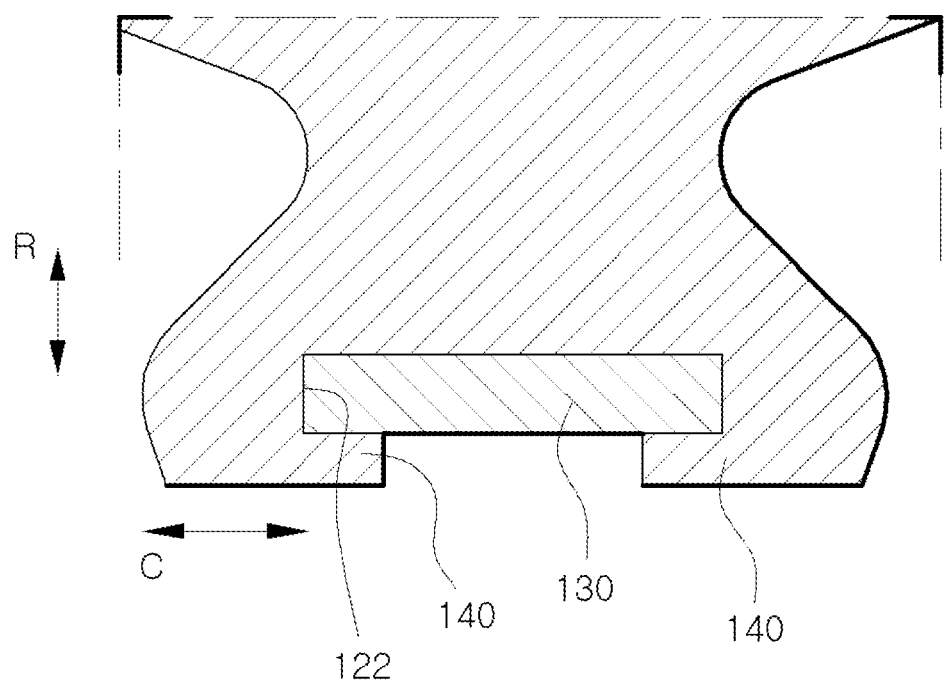
FIG. 6 is a front view of an insertion groove illustrated in FIG. 2.
Figure 7:
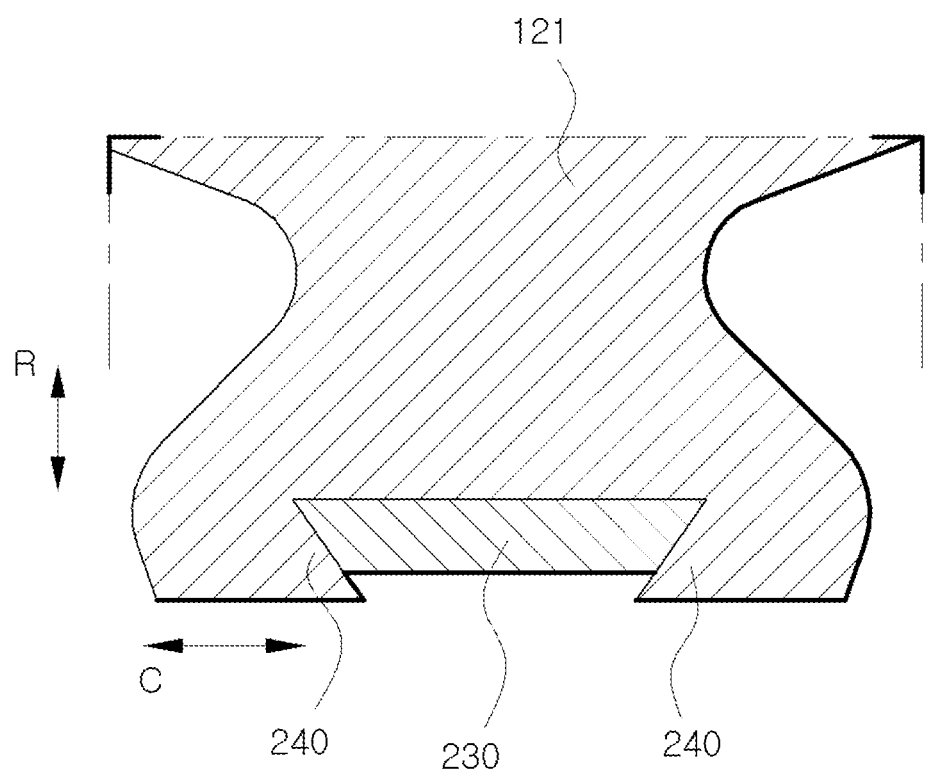
FIG. 7 is a diagram illustrating a modification to the structure illustrated in FIG. 6 according to a second exemplary embodiment.
Figure 8:
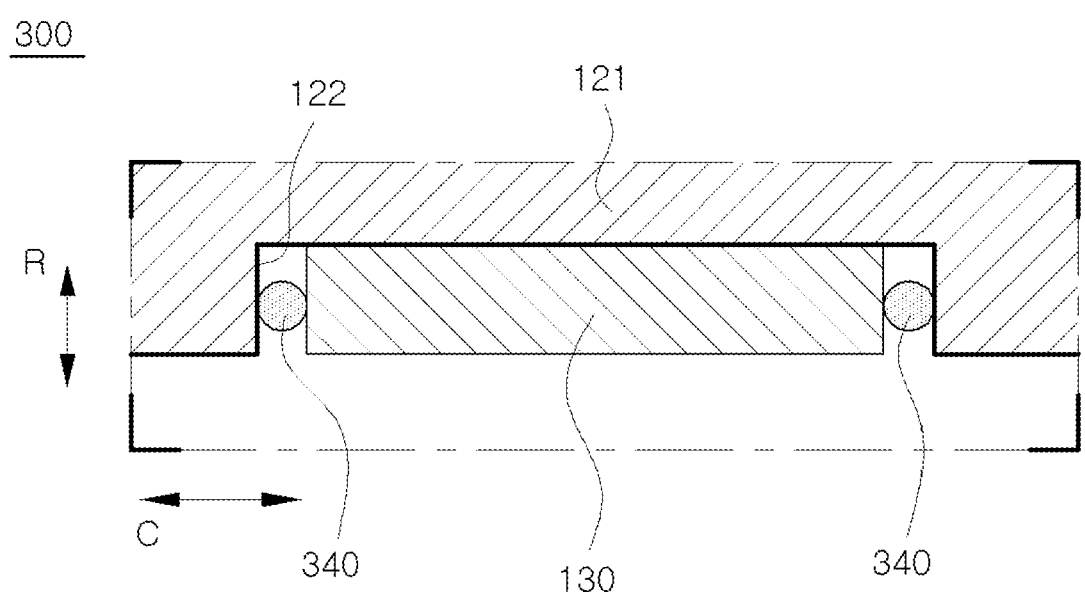
FIG. 8 is a cross-sectional view illustrating a root member taken along line B-B in FIG. 4 according to a third exemplary embodiment.
Figure 9:
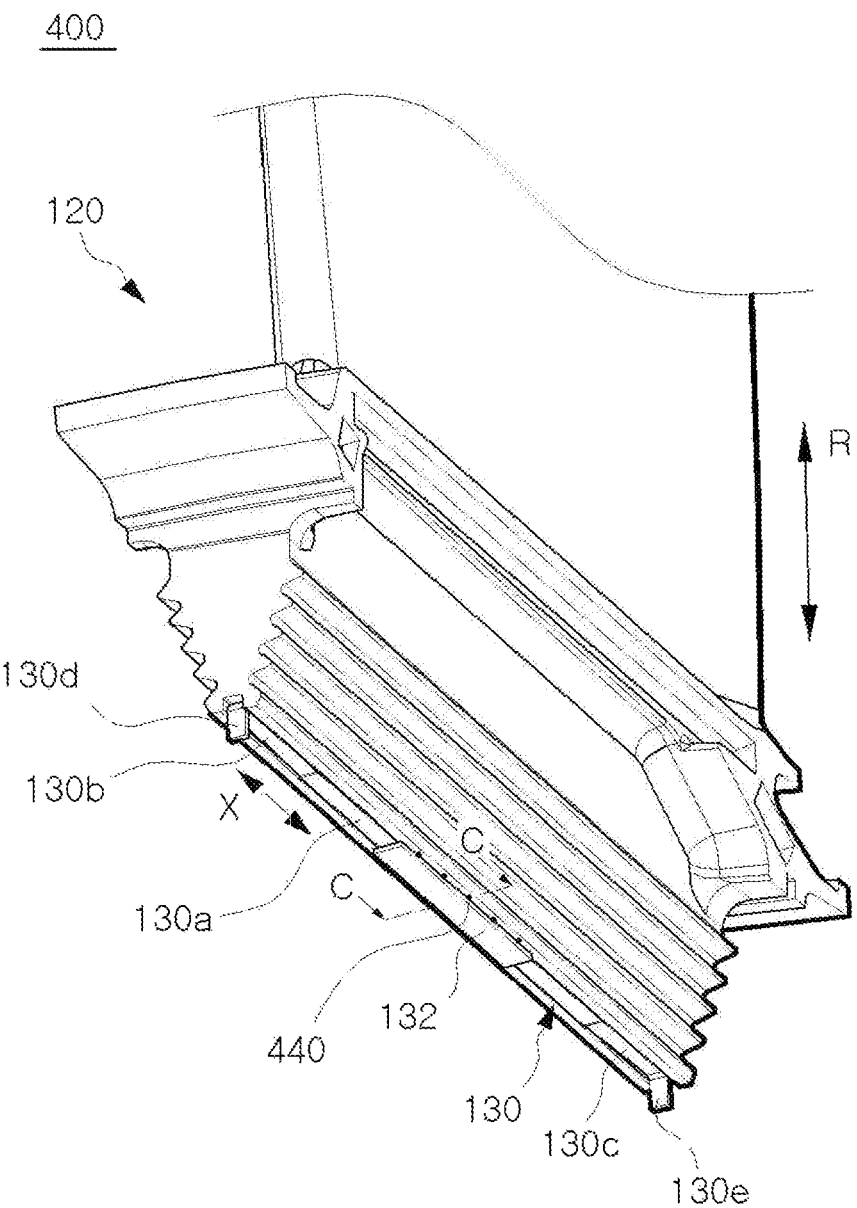
FIG. 9 is a view illustrating an auxiliary fastening sheet added to the structure of FIG. 4 according to a fourth exemplary embodiment.
Figure 10:
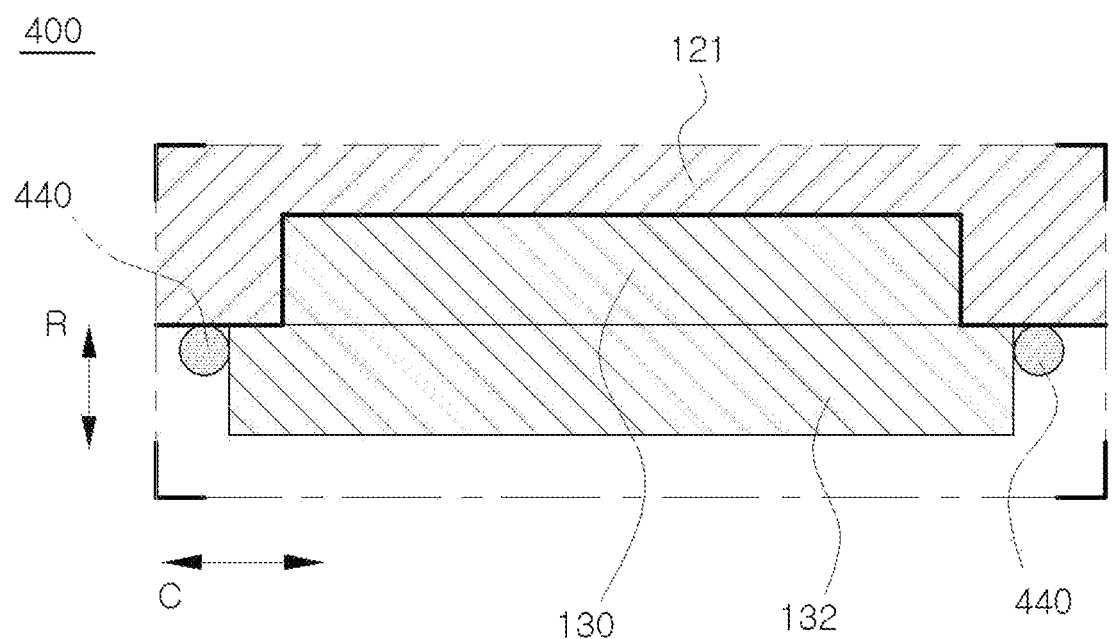
FIG. 10 is a cross-sectional view illustrating the root member taken along line C-C in FIG. 9.

FIG. 6 is a front view of an insertion groove illustrated in FIG. 2, FIG. 7 is a diagram illustrating a modification to the structure illustrated in FIG. 6 according to a second exemplary embodiment, FIG. 8 is a cross-sectional view illustrating a root member taken along line B-B in FIG. 4 according to a third exemplary embodiment, FIG. 9 is a view illustrating an auxiliary fastening sheet added to the structure of FIG. 4 according to a fourth exemplary embodiment, and FIG. 10 is a cross-sectional view illustrating the root member taken along line C-C in FIG. 9.

Referring to FIG. 6, in the turbine rotor 100 according to the first exemplary embodiment, the fixing portion 140 protrudes from the inner wall surface of the insertion groove 122 in the circumferential direction C, and is disposed so as to contact the inner surface of the locking sheet 130 in the radial direction R. Accordingly, the fixing portion 140 supports the locking sheet 130 in the radial direction R and prevents the locking sheet 130 from being deformed in the radial direction R when the wedge 131 is inserted into the turbine disk slot 111.

Referring to FIG. 7, in a turbine rotor 200 according to a second exemplary embodiment, a locking sheet 230 is shaped such that a width in the circumferential direction C gradually increases toward the outside in the radial direction R. For example, the locking sheet 230 may be formed in a trapezoidal shape such that an outer portion thereof in the radial direction R has a larger width in the circumferential direction C than an inner portion thereof in the radial direction R. A fixing portion 240 protrudes from the inner wall surface of the insertion groove 122 in the circumferential direction C, and is disposed in contact with the side surface of the locking sheet 230 when viewed in the axial direction X. The fixing portion 240 extends in a direction opposite to the circumference so that two fixing portions 240 set as a pair contact both sides of the locking sheet 230, respectively. The distance in the circumferential direction C between the pair of two fixing portions 240 gradually increases from the inner side to the outer side in the radial direction R. As illustrated in FIG. 7, the fixing portion 240 may be formed such that the outer surface of the radial direction R has an acute angle with respect to the inner surface of the radial direction R. Accordingly, the fixing portion 240 supports the locking sheet 230 in the radial direction R and prevents the locking sheet 230 from being deformed in the radial direction R when the wedge 131 is inserted into the turbine disk slot 111.

Referring to FIG. 8, in a turbine rotor 300 according to a third exemplary embodiment, a fixing portion 340 is first engaged with the locking sheet 130 and is then engaged with the root member 121, thereby fastening the locking sheet 130 to the root member 121. For example, the fixing portion 340 is disposed between the locking sheet 130 and the inner wall surface of the insertion groove 122. To this end, a width (i.e., size along the circumferential direction C) of the locking sheet 130 is smaller than a width (i.e., size along the circumferential direction C) of the insertion groove 122. A plurality of fixing portions 340 may be arranged at intervals in the axial direction X. That is, the fixing portions 340 are spaced apart from each other in the circumferential direction C, and one locking sheet 130 is interposed therebetween. Among the plurality of fixing portions 340, two fixing portions adjacent to each other are fastened to respective side surfaces of the interposed locking sheet 130. The fixing portion 340 is formed through a welding method and is disposed between the locking sheet 130 and the inner wall surface of the insertion groove 122. Accordingly, the fixing portion 340 fixes the locking sheet 130 to the inner wall surface of the insertion groove 122 and prevents the locking sheet 130 from being deformed when the wedge 131 is inserted into the turbine disk slot 111.

Referring to FIGS. 9 and 10, a turbine rotor 400 according to a fourth exemplary embodiment further includes an auxiliary fastening sheet 132. The auxiliary fastening sheet 132 is fastened to the inner surface of the locking sheet 130 in the radial direction R, and has a larger width (i.e., size measured along the circumferential direction C) than the locking sheet 130. For example, the auxiliary fastening sheet 132 is fastened to the inner wall surface, in the radial direction R, of the first sheet portion 130a of the locking sheet 130. A fixing portion 440 is fastened to the auxiliary fastening sheet 132 and to the inner end of the root member 121 in the radial direction R. A plurality of fixing portions 340 may be arranged at intervals in the axial direction X. Among the plurality of fixing portions 340, two fixing portions 340 adjacent to each other are spaced apart from each other in the axial direction X, with one locking sheet 130 interposed therebetween, and are fastened to respective side surfaces of the auxiliary fastening sheet 132. The fixing portions 440 are formed through a welding method and each of the fixing portions 440 is disposed between the auxiliary fastening sheet 132 and the inner end of the root member 121 in the radial direction R. Accordingly, each of the fixing portions 440 fixes the auxiliary fastening sheet 130 to the root member 121 and prevents the locking sheet 130 from being deformed when the wedge 131 is inserted into the turbine disk slot 111.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A rotor comprising:
   a disk including a disk slot;
   a blade including a root member inserted into the disk slot and an airfoil disposed outside the root member in a radial direction of the disk;
   a locking sheet, in an elongated form along an axial direction, disposed inside the root member in the radial direction; and
   a plurality of fixing portions disposed in an inner side of the root member in the radial direction and configured to fix the locking sheet to the root member,
   wherein the root member includes an insertion groove at a radially inner end thereof, and the locking sheet is inserted into the insertion groove, and
   wherein the plurality of fixing portions are arranged at intervals in the axial direction and spaced apart from each other in a circumferential direction of the disk, thereby the plurality of fixing portions fixing the locking sheet to a surface of the insertion groove.

2. The rotor according to claim 1, wherein the fixing portion is fastened to the locking sheet and an inner end of the root member to fix the locking sheet to the root member.

3. The rotor according to claim 2, wherein
the plurality of fixing portions are disposed between the locking sheet and an inner wall surface of the insertion groove.

4. The rotor according to claim 3, wherein the locking sheet is interposed between the plurality of fixing portions spaced apart from each other in the circumferential direction of the disk.

5. The rotor according to claim 2, further comprising an auxiliary fastening sheet fastened to an inner side of the locking sheet in the radial direction and configured to have a larger width measured along the circumferential direction than the locking sheet,
 wherein the fixing portion is fastened to the auxiliary fastening sheet and an inner end of the root member in the radial direction.

6. A turbo machine comprising:
a stator configured to guide fluid flowing through an inside thereof; and
a rotor installed in the stator and rotated by the fluid flowing through the inside of the stator,
wherein the rotor includes:
a disk including a disk slot;
a blade including a root member inserted into the disk slot and an airfoil disposed outside the root member in a radial direction of the disk;
a locking sheet, in an elongated form along an axial direction, disposed inside the root member in the radial direction; and
a plurality of fixing portions disposed in an inner side of the root member in the radial direction and configured to fix the locking sheet to the root member,
wherein the root member includes an insertion groove at a radially inner end thereof, and the locking sheet is inserted into the insertion groove, and
wherein the plurality of fixing portions are arranged at intervals in the axial direction and spaced apart from each other in a circumferential direction of the disk, thereby the plurality of fixing portions fixing the locking sheet to a surface of the insertion groove.

7. The turbo machine according to claim 6, wherein the fixing portion is fastened to the locking sheet and to an inner end of the root member to fix the locking sheet to the root member.

8. The turbo machine according to claim 7, wherein
the plurality of fixing portions are disposed between the locking sheet and an inner wall surface of the insertion groove.

9. The turbo machine according to claim 8, wherein the locking sheet is interposed between the plurality of fixing portions spaced apart from each other in the circumferential direction of the disk.

10. The turbo machine according to claim 7, wherein the rotor further includes an auxiliary fastening sheet fastened to an inner side of the locking sheet in the radial direction and configured to have a larger width measured along the circumferential direction than the locking sheet, and
 the fixing portion is fastened to the auxiliary fastening sheet and an inner end of the root member in the radial direction.

\* \* \* \* \*